United States Patent
Hosaka et al.

(10) Patent No.: US 10,562,483 B2
(45) Date of Patent: Feb. 18, 2020

(54) COATED BASE FABRIC FOR AN AIRBAG, AIRBAG, AND METHOD OF PRODUCING COATED BASE FABRIC FOR AN AIRBAG

(71) Applicant: Toray Industries, Inc., Tokyo (JP)

(72) Inventors: Taiki Hosaka, Osaka (JP); Daisuke Yokoi, Osaka (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/562,507

(22) PCT Filed: Mar. 28, 2016

(86) PCT No.: PCT/JP2016/059923
§ 371 (c)(1),
(2) Date: Sep. 28, 2017

(87) PCT Pub. No.: WO2016/158858
PCT Pub. Date: Oct. 6, 2016

(65) Prior Publication Data
US 2018/0093634 A1    Apr. 5, 2018

(30) Foreign Application Priority Data
Mar. 30, 2015 (JP) ................................. 2015-069982

(51) Int. Cl.
| | | |
|---|---|---|
| B60R 21/235 | (2006.01) | |
| D03D 1/02 | (2006.01) | |
| B60R 21/23 | (2006.01) | |
| D06M 15/643 | (2006.01) | |
| D06M 15/19 | (2006.01) | |

(52) U.S. Cl.
CPC ............ *B60R 21/235* (2013.01); *B60R 21/23* (2013.01); *D03D 1/02* (2013.01); *D06M 15/19* (2013.01); *D06M 15/643* (2013.01); *B60R 2021/23514* (2013.01); *D10B 2331/02* (2013.01); *D10B 2505/124* (2013.01)

(58) Field of Classification Search
CPC .......... B60R 2021/23514; B60R 21/23; B60R 21/235; D03D 1/02; D06M 15/643; D06M 15/19
See application file for complete search history.

(56) References Cited

U.S. PATENT DOCUMENTS

| | | |
|---|---|---|
| 2003/0060103 A1 | 3/2003 | Nagaoka et al. |
| 2010/0048079 A1* | 2/2010 | Fujiyama .............. B60R 21/235 442/189 |
| 2011/0036447 A1 | 2/2011 | Horiguchi et al. |
| 2012/0231273 A1 | 9/2012 | Horiguchi et al. |

FOREIGN PATENT DOCUMENTS

| | | | |
|---|---|---|---|
| EP | 2 557 210 A2 | 2/2013 | |
| JP | 2006-52505 A | 2/2006 | |
| JP | 2006-249655 A | 9/2006 | |
| JP | 2007-138356 A | 6/2007 | |
| JP | 2007-138357 A | 6/2007 | |
| JP | 2009-167551 A | 7/2009 | |
| JP | 2010-100988 A | 5/2010 | |
| JP | 2011-58118 | * 3/2011 | ............... D03D 1/02 |
| JP | 2011-58118 A | 3/2011 | |
| JP | 2013-23784 A | 2/2013 | |

OTHER PUBLICATIONS http://fiberarts.org/design/articles/jackloom2.html (Year: 1998).*
Extended European Search Report dated Nov. 23, 2018, of counterpart European Application No. 16772739.5.

* cited by examiner

*Primary Examiner* — Arti Singh-Pandey
(74) *Attorney, Agent, or Firm* — DLA Piper LLP (US)

(57) ABSTRACT

A coated base fabric for an airbag has a fabric composed of polyamide fibers provided with a resin coating, wherein the polyamide fibers which compose the base fabric have a total fineness of not less than 100 dtex and not more than 250 dtex and a tenacity of not less than 8.1 cN/dtex and the coated base fabric has a basis weight of not more than 170 g/m², packability of the base fabric in accordance with ASTM D6478-02 of not more than 1,400 cm³, a tear strength in a warp direction and a weft direction of not less than 200 N and an edgecomb resistance in the warp direction and the weft direction of not less than 200 N.

8 Claims, No Drawings

COATED BASE FABRIC FOR AN AIRBAG, AIRBAG, AND METHOD OF PRODUCING COATED BASE FABRIC FOR AN AIRBAG

TECHNICAL FIELD

This disclosure relates to a coated base fabric for an airbag, an airbag and a method of producing a coated base fabric for an airbag. More specifically, the disclosure relates to a light-weight and compact coated base fabric for an airbag with excellent burst resistance, an airbag produced by sewing the coated base fabric for an airbag and a method of producing a coated base fabric for an airbag.

BACKGROUND

In recent years, vehicles have been equipped with various airbags to ensure safety of passengers upon a vehicle collision. Examples of various airbags include an airbag to protect a driver, an airbag to protect a passenger seat person, an airbag to protect knees, an airbag incorporated within a seat to protect the chest, an airbag incorporated within a ceiling above windows to protect the head and the like. Each airbag is loaded as a module including a gas generator (inflator) in a narrow place. Accordingly, a base fabric used for an airbag is required to be light in weight and compact during packaging.

Also, airbags are required to have a property (burst resistance) of not bursting due to an impact or an inner pressure of the bag at deployment. To obtain an airbag with excellent burst resistance, a base fabric therefore needs to have less yarn slippage (i.e. high resistance to yarn slippage) and excellent mechanical properties (tensile strength, tear strength and the like).

To compatibly achieve both light weight property and compactness and excellent burst resistance, a base fabric using a yarn with a lower fineness has been studied. For example, in JP 2006-249655 A, a coated cloth using a yarn with a total fineness of 67 to 350 dtex is proposed. In JP 2009-167551 A, a fabric with a basis weight of not more than 190 g/m² composed of a fiber yarn having a total fineness of 250 to 350 dtex and a tenacity of not less than 9 cN/dtex is proposed as a fabric by which a light-weight and high impact resistant airbag can be obtained. Further, as a means of obtaining an excellent tenacity of base fabric or heat resistance in a base fabric using a yarn with a low total fineness, in JP 2007-138356 A and JP 2007-138357 A, a production method of a base fabric in which a fiber yarn with a high tenacity is used in combination at least partly in a warp and/or a weft and woven is proposed. Additionally, in JP 2013-023784 A, a fabric with a basis weight of not more than 175 g/m² composed of a fiber yarn having a total fineness of 250 to 300 dtex and a tenacity of 8.8 to 10.0 cN/dtex is proposed.

The cloth as disclosed in JP 2006-249655 A has a tear strength of not more than about 180 N which is insufficient for preventing a tear of an airbag. Further, the technique as disclosed in JP 2006-249655 A does not satisfy a favorable balance of both resistance to yarn slippage and tensile strength and thus burst resistance is insufficient. In the technique as disclosed in JP 2009-167551 A, the basis weight of the base fabric is not less than 174 g/m² and the base fabric cannot be said to be sufficiently light in weight and compact. Additionally, the technique as disclosed in JP 2009-167551 A does not satisfy a favorable balance of both resistance to yarn slippage and tensile strength and thus burst resistance is insufficient. The techniques as disclosed in JP 2007-138356 A and JP 2007-138357 A are expensive since a fiber with a high strength is used in combination and additionally, resistance to yarn slippage is not improved and burst resistance is insufficient. The technique as disclosed in JP 2013-023784 A does not satisfy a favorable balance of both resistance to yarn slippage and tensile strength.

It could therefore be helpful to provide a light-weight and compact coated base fabric with excellent burst resistance for an airbag, an airbag on which the coated base fabric for an airbag is sewn and a production method of the coated base fabric for an airbag.

SUMMARY

We thus provide:

A coated base fabric for an airbag in which a fabric composed of polyamide fibers is provided with a resin coating, wherein the polyamide fibers composing the base fabric have a total fineness of not less than 100 dtex and not more than 250 dtex and a tenacity of not less than 8.1 cN/dtex and the coated base fabric for airbag has a basis weight of not more than 170 g/m², base fabric packability in accordance with ASTM D6478-02 of not more than 1,400 cm³, a tear strength in a warp direction and a weft direction of not less than 200 N and an edgecomb resistance in the warp direction and the weft direction of not less than 200 N.

Moreover, a coated base fabric has a fabric woven from polyamide fibers provided with a resin coating, wherein the polyamide fibers have a total fineness of not less than 100 dtex and not more than 250 dtex and a tenacity of not less than 9.0 cN/dtex and the coated base fabric for airbag has a basis weight of not more than 170 g/m², packability of the base fabric in accordance with ASTM D6478-02 of not more than 1,400 cm³, a tear strength in a warp direction and a weft direction of not less than 200 N and a slippage resistance in the warp direction and the weft direction of not less than 200 N.

Further, an airbag may be produced by sewing either of the above-described coated base fabrics.

In addition, a method of producing a coated base fabric for an airbag performs weaving while adjusting warp tension to 30 to 70 cN/end.

DETAILED DESCRIPTION

Coated Base Fabric for an Airbag

A coated base fabric for an airbag (hereinafter, also referred to simply a base fabric) according to one example is a base fabric in which a fabric produced by weaving polyamide fibers is subjected to resin coating.

Fabric in which Polyamide Fibers are Woven

Examples of a polyamide fiber include fibers consisting of nylon 6, nylon 6,6, nylon 1,2, nylon 4,6, or a copolymer polyamide of nylon 6 and nylon 6,6, copolymer polyamides in which nylon 6 is copolymerized with polyalkylene glycol, dicarboxylic acid, amine or the like. A polyamide fiber is preferably a fiber consisting of nylon 6 or nylon 6,6 since an airbag to be obtained has excellent impact resistance.

In this example, total fineness of the polyamide fibers is not limited as long as it is not less than 100 dtex and is preferably not less than 150 dtex. On the other hand, the total fineness of the polyamide fibers is not limited as long as it is not more than 250 dtex and is preferably not more than 245 dtex, more preferably not more than 240 dtex. When the total fineness is less than 100 dtex, mechanical properties (tensile strength, tear strength and the like) required for an airbag to be obtained are hardly obtained. On the other hand, when the total fineness exceeds 250 dtex, light-weight property and compactness of the obtained base fabric are hardly obtained. By adjusting the total fineness of the polyamide fibers to the above range, the obtained base fabric has improved light-weight property and compactness. In addition, if the total fineness of the polyamide fibers is within the above preferable range, not only light-weight property and compactness but also tear strength and slippage resistance are easily improved in a good balance in the obtained base fabric. The total fineness of the polyamide fibers is calculated based on JIS L1013 (2010) 8.3.1 method A.

Moreover, a single fiber fineness of the polyamide fibers is preferably not less than 1 dtex, more preferably not less than 1.5 dtex, further preferably not less than 2 dtex. On the other hand, the single fiber fineness of the polyamide fibers is preferably not more than 4 dtex, more preferably not more than 3 dtex. In this manner, the preferable single fiber fineness of the polyamide fibers is 1 to 4 dtex which is a relatively low fineness. If the single fiber fineness is not less than 1 dtex, a breakage of single fibers during production can be inhibited and the polyamide fiber is easily produced. On the other hand, if the single fiber fineness is not more than 4 dtex, flexibility of a warp and a weft to be obtained of the polyamide fibers improves. Consequently, the airbag to be obtained is likely to have improved compactness. Specifically, if the single fiber fineness of the polyamide fibers is within the above preferable range, a gap between single fibers in a fabric is likely to become small. As a result, an adhesion between a warp and a weft can be improved and resistance to yarn slippage can be improved. The single fiber fineness of the polyamide fibers can be calculated by dividing the total fineness by a number of filaments. The number of filaments can be calculated based on a method of JIS L1013 (2010) 8.4.

The cross-sectional shape of the single fiber of the polyamide fibers is not particularly limited. As one example, the cross-sectional shape of the single fiber may be circular or various non-circular shapes such as Y-type, V-type, flattened shape and the like, and may have a hollow portion. Among these shapes, the cross-sectional shape of the single fiber is preferably circular from the viewpoint of spinnability.

Returning to the explanation of the polyamide fibers in its entirety, tenacity of the polyamide fibers of this example is not limited as long as it is not less than 9.0 cN/dtex and is preferably not less than 9.2 cN/dtex. When the tenacity of the polyamide fibers is less than 9.0 cN/dtex, the obtained base fabric hardly has sufficient mechanical properties (tenacity, tear strength and the like). On the other hand, an upper limit of the tenacity is not limited particularly. When productivity of the polyamide fibers is considered, the upper limit of the tenacity can be adjusted to about 10.0 cN/dtex. The tenacity of the polyamide fibers can be calculated by a measurement under a condition of a constant rate of expansion shown in a standard test in accordance with JIS L1013 (2010) 8.5.1.

Elongation of the polyamide fibers is preferably not less than 20%, more preferably not less than 21%. On the other hand, the elongation of the polyamide fibers is preferably not more than 25%, more preferably not more than 24%. When the elongation of the polyamide fibers is within the above range, the fabric to be obtained is excellent in toughness and a work of rupture. Further, in the polyamide fibers exhibiting an elongation within the above range, spinnability and weaving properties can be improved. Elongation of the polyamide fibers can be calculated based on an elongation of a point for a maximum tenacity in an S-S curve, which is obtained when the above tenacity is calculated.

To improve productivity in a spinning process, a drawing process and a manufacturing process and characteristics of the obtained fabric, the polyamide fibers may appropriately compound additives such as a heat stabilizer, an antioxidant, a light stabilizer, a smoothing agent, an anti-static agent, a plasticizer, a thickener, a pigment, a flame retardant and the like.

Returning to the explanation of the fabric in its entirety, a cover factor (CF) of the fabric is preferably not less than 1,800, more preferably not less than 1,900. On the other hand, a cover factor (CF) of the fabric is preferably not more than 2,300, more preferably not more than 2,200. When the cover factor of the fabric is within the above range, compactness and air-shielding property of the obtained base fabric is likely to improve in a good balance. When the cover factor of the fabric is less than 1,800, a fabric weave constraint of the fabric is decreased and slippage resistance of the base fabric is likely to become low. On the other hand, when the cover factor exceeds 2,300, compactness is likely to deteriorate. In this example, the cover factor (CF) of the fabric is a value calculated from a total fineness and a fabric density of a yarn used for a warp or a weft and defined by formula (1). In formula (1), Dw represents a warp total fineness (dtex), Df represents a weft total fineness (dtex), Nw represents a fabric density of warp (yarns/2.54 cm) and Nf represents a fabric density of weft (yarns/2.54 cm).

$$CF=(Dw \times 0.9)^{1/2} \times Nw + (Df \times 0.9)^{1/2} \times Nf \qquad (1)$$

Resin

The base fabric of the example is coated with a resin on at least one side of the fabric. By coating at least one side of the fabric with a resin, the base fabric is given air-shielding property. Moreover, even when gas at high temperature generates from an inflator at deployment of the airbag, the fabric coated with a resin on at least one side thereof (in particular a one side disposed on the inner side of the airbag) is prone to be protected by heat.

The kind of a resin is not limited particularly and examples thereof include a polyamide resin, a polyurethane resin, a silicone resin and the like. Among them, it is preferable that the fabric is coated with a silicone resin. This enables the base fabric to obtain more excellent heat resistance, cold resistance, flame retardancy, air-shielding property and the like. Examples of the silicone resin include a dimethyl silicone resin, a methyl vinyl silicone resin, a methyl phenyl silicone resin, fluoro silicone resin and the like.

The resin suitably compounds a flame-retardant compound. An example of the flame-retardant compound is a halogen compound containing bromine, chlorine or the like. Specific examples of the flame-retardant compound include a halogenated cycloalkane, a platinum compound, an antimony oxide, a copper oxide, a titanium oxide, a phosphorus compound, a thiourea compound, carbon, cerium, a silicon oxide and the like. Among them, the flame-retardant compound is preferably a halogen compound, a platinum compound, a copper oxide, a titanium oxide, carbon or the like.

The viscosity of the resin at the time of being coated on the fabric is preferably 5 to 20 Pa·s (5,000 to 20,000 cP) to easily apply a certain amount of the resin stably to the fabric. The resin may be a non-solvent type which originally exhibits such a viscosity, or may be a solvent type which is appropriately diluted with a solvent to have such a viscosity. Among them, a non-solvent type resin is preferable since it is excellent in workability and the burden on the environment is small. The viscosity of the resin can be measured under an environment of 20° C. by use of a B-type viscometer based on JIS Z8803 (2011). When the viscosity of the resin is less than 5 Pa·s (5,000 cP), there is a tendency that the viscosity is too low and the resin is not suitable for a coating operation (for example, a coating operation of the resin by a knife coating method). On the other hand, when the viscosity of the resin exceeds 20 Pa·s (20,000 cP), the coating in a low coating weight is impossible and packability of the obtained base fabric tends to be inferior.

The coating weight of the resin is preferably not less than 5 g/m², more preferably not less than 10 g/m². On the other hand, the coating weight of the resin is preferably not more than 20 g/m², more preferably not more than 18 g/m², further preferably not more than 15 g/m². When the coating weight of the resin is within the above range, not only packability but also mechanical properties (tear strength, slippage resistance and the like) of the fabric are likely to be improved in a good balance. When the coating weight of the resin is less than 5 g/m², the resin is hard to be uniformly coated on the surface of the fabric and sufficient air-shielding property is hard to obtain. As a result, an inner pressure at deployment of the obtained airbag is hard to maintain. On the other hand, when the coating weight of the resin exceeds 20 g/m², the cost of the base fabric is likely to become high and compactness tends to deteriorate.

Returning to the explanation of the base fabric in its entirety, in the base fabric of the example, both a tear strength and an edgecomb resistance in the warp direction and the weft direction are not less than 200 N. The tear strength and the edgecomb resistance in the warp direction and the weft direction are not limited as long as they are not less than 200 N and are preferably not less than 210 N. As for edgecomb resistance, it is more preferably not less than 270 N. An upper limit of the tear strength in the warp direction and the weft direction is not limited particularly. The upper limit of the tear strength is preferably about 300 N from the viewpoint of a balance with resistance to yarn slippage. Also, the upper limit of the edgecomb resistance in the warp direction and the weft direction is not limited particularly. As an example, the upper limit of the edgecomb resistance is about 500 N. When the edgecomb resistance exceeds 500 N, while the obtained base fabric has a small yarn slippage, the tear strength is relatively decreased and burst resistance tends to deteriorate.

There are various factors in a burst at deployment of an airbag. A light-weight and compact base fabric in which a yarn with a low fineness is used is likely to have a deteriorated tear strength and an edgecomb resistance compared to a base fabric in which a yarn with a higher fineness such as, for example, a yarn of 940 dtex, 470 dtex and the like is used. Accordingly, in the obtained airbag, there is a tendency that stress concentrates to the portion where an inflator is mounted and generates a burst (tear burst) or high temperature gas blows out from a yarn slippage of the sewn portion and a burst due to melting of the yarn slippage portion generates. However, the base fabric of the example uses polyamide fibers with a relatively low fineness of a total fineness of 100 dtex to 250 dtex as described above which is light in weight and excellent in compactness. In addition, the base fabric of the example uses polyamide fibers with a tenacity of not less than 9.0 cN/dtex. Moreover, the base fabric of the example is woven in a high tension by a production method, one example of which will be explained below in detail, and is coated with a resin, thereby allowing both a tear strength and an edgecomb resistance in the warp direction and the weft direction to be adjusted to be not less than 200 N. Consequently, the obtained airbag realizes a light-weight property and compactness and is excellent in burst resistance at deployment.

The tensile strength in both the warp direction and the weft direction of the base fabric is preferably not less than 450 N/cm, more preferably not less than 500 N/cm, further preferably not less than 550 N/cm. The upper limit of the tensile strength is not limited particularly. As one example, the tensile strength is about 600 N/cm. When the tensile strength is less than 450 N/cm, the mechanical strength as necessary at deployment of the obtained airbag tends to become insufficient.

The packability of the base fabric is not limited as long as it is not more than 1,400 cm³ and is preferably not more than 1,350 cm³. A lower limit of the packability of the base fabric is not limited particularly. To adjust the packability of the base fabric to less than 1,000 cm³, a fineness of the polyamide fibers or a density of the fabric needs to be decreased. In that case, the improvement of both compactness and burst resistance of the base fabric is difficult. Accordingly, the lower limit of the packability of the base fabric is preferably not less than 1,000 cm³. When packability of the base fabric exceeds 1,400 cm³, sufficient compactness is not obtained compared to conventional base fabrics.

A basis weight of the base fabric is not limited as long as it is not more than 170 g/m² and is preferably not more than 165 g/m². When the basis weight exceeds 170 g/m², the weight of the obtained airbag becomes large. Meanwhile, lightening the base fabric is directly linked to fuel efficiency of vehicles and thus the smaller the lower limit of the basis weight is, the better it is. On the other hand, the lower limit of the basis weight is preferably not less than 130 g/m² from the viewpoint of a required heat resistant capacity. The basis weight can be calculated based on JIS L1096: 1999 8.4.2.

A thickness of the base fabric is preferably not less than 0.15 mm, more preferably not less than 0.18 mm. On the other hand, the thickness of the base fabric is preferably not more than 0.30 mm, more preferably not more than 0.25 mm. When the thickness of the base fabric is within the above range, a space for passengers is easily ensured in a vehicle to which the airbag is attached. In addition, the degree of freedom of designability within a vehicle is likely to be improved. If the thickness is less than 0.15 mm, the mechanical properties (tear strength, edgecomb resistance and the like) of the base fabric tend to be difficult to obtain. On the other hand, if the thickness exceeds 0.30 mm, compactness of the base fabric is likely to deteriorate.

As described above, the base fabric of the example is woven using polyamide fibers with a relatively low fineness of a total fineness of not less than 100 dtex and not more than 250 dtex and thus is light in weight and excellent in compactness. In addition, the base fabric of the example is woven with polyamide fibers with a tenacity of not less than 9.0 cN/dtex. Further, by coating the base fabric of the example with a resin, both a tear strength and an edgecomb resistance in a warp direction and a weft direction of the base fabric are adjusted to be not less than 200 N. Consequently, the obtained airbag realizes a light-weight property and compactness and is excellent in burst resistance at deployment.

As an alternative example, the coated base fabric of the example may be a coated base fabric in which a coating of resin is provided on a fabric consisting of polyamide fibers. The alternative example is a coated base fabric in which a coating of resin is provided on a fabric consisting of polyamide fibers and the polyamide fibers which compose the base fabric is polyamide fibers with a relatively low fineness of a total fineness of not less than 100 dtex and not more than 250 dtex and a tenacity of not less than 8.1 cN/dtex. The base fabric of the alternative example is coated with a resin, thereby both a tear strength and an edgecomb resistance in a warp direction and a weft direction are adjusted to be not less than 200 N. Consequently, the obtained airbag realizes a light-weight property and compactness and is excellent in burst resistance at deployment.

Airbag

The airbag of one example is an airbag produced by sewing the base fabric (coated base fabric for airbag) of the above example. The airbag of the example can be produced by a known method. Namely, the airbag is produced by sewing a base fabric into a bag shape and mounting an attachment such as an inflator thereto.

The base fabric composing an airbag is, as detailed in the above example, light in weight and excellent in compactness. Further, by coating the base fabric with a resin, both the tear strength and edgecomb resistance in the warp direction and the weft direction of the base fabric are adjusted to be not less than 200 N. Consequently, the airbag of the example realizes a light-weight property and compactness and is excellent in burst resistance at deployment. Accordingly, the airbag of the example is useful as an airbag to protect a driver, an airbag to protect a passenger seat person, an airbag to protect knees, an airbag incorporated within a seat to protect the chest, an airbag incorporated within a ceiling above windows to protect the head and the like.

Production Method of Coated Base Fabric for Airbag

The production method of the coated base fabric (hereinafter also referred to simply as the production method of the base fabric) of one example is a production method of the base fabric (coated base fabric) of the above example. The production method of the base fabric is characterized in that weaving is performed while adjusting warp tension to 30 to 70 cN/end. Therefore, any of other processes as shown below are an exemplification and may be replaced by other known processes appropriately.

According to the example, with reference to the base fabric, warps with the above total fineness are warped and arranged in a loom. Wefts are arranged in the loom in the similar manner. The loom is not limited particularly. Examples of the loom include a water jet loom, an air jet loom, a rapier loom and the like. Among them, the loom is preferably a water jet loom since it can allow a high speed weaving relatively easily and is easy to improve productivity. The warps and wefts are preferably polyamide fibers of the same type. It is also preferable that the warps and wefts are woven to have the same fabric density. In the example, "polyamide fibers of the same type" means fibers with an equivalent polymer type, total fineness and physical properties. "The same fabric density" means that a difference of the fabric density between warps and wefts after weaving is not more than 1.5 threads. The fabric density can be calculated based on JIS L1096: 2010 8.6.1.

Upon weaving, the warp tension is preferably adjusted to not less than 30 cN/end and the warp tension is more preferably adjusted to not less than 40 cN/end. On the other hand, the warp tension is preferably adjusted to not more than 70 cN/end and the warp tension is more preferably adjusted to not more than 65 cN/end. When the warp tension is within the above range, as the wefts are beaten, the warps under a tension works to bend the wefts, leading to increase in the fabric weave constraint force of the woven fabric in the weft direction. As a result, the obtained woven fabric has improved resistance to yarn slippage. In the example, the fabric weave constraint refers to a property that warps and wefts restrain each other and fibers in the fabric become difficult to move. Moreover, in the airbag obtained using this fabric, a yarn slippage of the sewn portion and air leakage hardly occur. When the warp tension is less than 30 cN/end., a contact area (adhesion) between warps and wefts in the fabric hardly increases. Therefore, the edgecomb resistance hardly increases. In addition, when the warp tension is less than 30 cN/end., the fabric weave constraint of warps during weaving is low and the base fabric in which the density of warps and wefts is the same is hardly obtained. On the other hand, when the warp tension exceeds 70 cN/end., a contact area (adhesion) between warps and wefts in the fabric tends to increase. Therefore, while the edgecomb resistance of the obtained base fabric can be improved, warps easily fluff. As a result, weaving properties tend to be inferior.

A method of adjusting the warp tension is not particularly limited. As an example, the warp tension can be adjusted by a method of adjusting a warp feeding speed of a loom, a method of adjusting a beating speed of wefts and the like. Whether the warp tension is within the above range or not can be checked by, for example, measuring a tension applied to a warp with a tension measuring device in a center portion between a warp beam and a back roller during operation of the loom.

In the production method of the base fabric of the example, a shedding timing in weaving is preferably not less than 330 degrees. It is also preferable that the shedding timing is not more than 340 degrees. When the shedding timing is within the above range, an error such as, for example, an insertion defect of wefts during weaving hardly occurs and weaving properties are satisfactory. When the shedding timing is less than 330 degrees, an insertion defect of wefts tends to increase. On the other hand, when the shedding timing exceeds 340 degrees, a restraint of wefts is not performed sufficiently and weaving properties tend to be inferior. In the example, "the shedding timing" assumes one reciprocal motion of a reed (one rotation of loom) as 360 degrees and each timing is represented among 0 to 360 degrees. The timing of 0 degree (360 degrees) refers to a timing when the reed moves to the most forward portion of the front side of the loom.

When weaving is finished, processes such as refinement, heat setting and the like are performed as necessary to the obtained fabric. In a refinement step, the fabric is put into a plurality of tanks and washed with water. At that time, a scouring agent (for example, a nonionic surfactant, an anionic surfactant) is compounded appropriately. The temperature of water in each tank is suitably about 40 to 70° C. The scouring agent is thereby activated and an oil agent, wax and the like attached to the fabric yarn can be effectively removed. In the heat setting step, a dryer is used. Examples of the dryer include a heated air dryer, a suction drum dryer, a non-touch dryer and the like.

Thereafter, a resin is applied on at least one side of the fabric. A coating method of the resin is not limited particularly. As an example, the resin is preferably coated by a knife coating method since the coating weight can be reduced and the coating is stable. The knife coating method includes a knife over roll method, a knife over belt method, a floating knife method and the like. Among them, it is more preferable that the resin is coated by a floating knife method since the coating weight of the resin can be reduced and the infiltration of the fabric with the resin is easier. In the knife coating method, it is preferable that a tension of the base fabric is adjusted to 500 to 3,000 N/m. Also, it is preferable that a contact pressure with a knife is adjusted to 1 to 15 N/cm.

When the tension of the base fabric and the contact pressure with the knife are within the above range, the fabric can be fixed in the state where a yarn bundle is deformed by coating. As a result, in the obtained base fabric, penetration of the resin into the fabric can be minimalized and flexibility and compactness can improve.

It is preferable that the thus obtained base fabric has the following configuration. Namely, the tenacity of the polyamide fibers which compose the base fabric is not limited as long as it is not less than 8.1 cN/dtex and is preferably not less than 8.2 cN/dtex. If the tenacity of the polyamide fibers which compose the base fabric is too small, sufficient mechanical properties (tensile strength, tear strength and the like) of the base fabric are hardly obtained. The upper limit of the tenacity is not limited particularly. When productivity of the polyamide fibers as an original yarn is considered, the upper limit of the tenacity can be adjusted to about 10.0 cN/dtex. The tenacity of the polyamide fibers which compose the base fabric can be calculated in the same manner as that of the tenacity as described above, by using a fiber (disintegrated yarn) taken from the base fabric.

The elongation of the polyamide fibers which compose the base fabric is preferably not less than 19.0%, more preferably not less than 19.5%. On the other hand, the elongation of the polyamide fibers is preferably not more than 25.0%, more preferably not more than 22.5%. When the elongation of the polyamide fibers which compose the base fabric is within the above range, the base fabric is excellent in toughness and a work of rupture. The elongation of the polyamide fibers composing the base fabric can be calculated in the same manner as that of the elongation as described above, by using a disintegrated yarn.

The total fineness of the polyamide fibers composing the base fabric is not limited as long as it is not less than 100 dtex and is preferably not less than 170 dtex. On the other hand, the total fineness of the polyamide fibers is not limited as long as it is not more than 250 dtex and is preferably not more than 245 dtex, more preferably not more than 240 dtex. If the total fineness is too small, necessary mechanical properties (tensile strength, tear strength and the like) of the base fabric are hardly obtained. On the other hand, if the total fineness is too large, the base fabric is likely to be inferior in light-weight property and compactness. By the total fineness of the polyamide fibers being adjusted to the above range, not only light-weight property and compactness but also tear strength and edgecomb resistance of the base fabric can be likely to improve in a good balance. The total fineness of the polyamide fibers composing the base fabric can be calculated in the same manner as that of the total fineness as described above, by using a disintegrated yarn.

The base fabric obtained in this manner is light in weight and excellent in compactness. Further, by coating the base fabric with a resin, both a tear strength and an edgecomb resistance in a warp direction and a weft direction of the base fabric are adjusted to be not less than 200 N. Consequently, the base fabric is particularly useful as a base fabric for airbag which realizes a light-weight property and compactness and is excellent in burst resistance at deployment.

In the above, one example is explained. This disclosure is not limited particularly to the above example. The above example mainly explains the following configurations.

(1) A coated base fabric in which a fabric composed of polyamide fibers is provided with a resin coating, wherein the polyamide fibers composing the base fabric have a total fineness of not less than 100 dtex and not more than 250 dtex and a tenacity of not less than 8.1 cN/dtex and the coated base fabric has a basis weight of not more than 170 g/m$^2$, packability of the base fabric in accordance with ASTM D6478-02 of not more than 1,400 cm$^3$, a tear strength in a warp direction and a weft direction of not less than 200 N and an edgecomb resistance in the warp direction and the weft direction of not less than 200 N.

(2) A coated base fabric in which a fabric woven from polyamide fibers is provided with a resin coating, wherein the polyamide fibers have a total fineness of not less than 100 dtex and not more than 250 dtex and a tenacity of not less than 9.0 cN/dtex and the coated base fabric has a basis weight of not more than 170 g/m$^2$, packability of the base fabric in accordance with ASTM D6478-02 of not more than 1,400 cm$^3$, a tear strength in a warp direction and a weft direction of not less than 200 N and an edgecomb resistance in the warp direction and the weft direction of not less than 200 N.

In accordance with such configuration, the base fabric, formed by weaving polyamide fibers having the above total fineness and tenacity, exhibits the above basis weight and packability of a base material. Therefore, the obtained airbag is sufficiently light in weight and compact. Further, the base fabric exhibiting the above tear strength and the edgecomb resistance hardly bursts at deployment when used as an airbag, while being sufficiently light in weight and compact.

(3) The coated base fabric for an airbag of (1) or (2), wherein a coating weight of the resin is 5 to 20 g/m$^2$.

In accordance with such configuration, the resin can uniformly cover the surface of the fabric and provide the base fabric with sufficient air-shielding property. Additionally, the resin can improve heat resistance or various mechanical properties without inhibiting compactness of the base fabric for airbag.

(4) The coated base fabric for an airbag of any of (1) to (3), wherein a single fiber fineness of the polyamide fibers is 1 to 4 dtex.

In accordance with such configuration, the polyamide fibers have sufficient flexibility. Further, the obtained coated base fabric is light in weight and compact.

(5) An airbag produced by sewing the coated base fabric for an airbag of any of (1) to (4).

In accordance with such configuration, the airbag is produced by sewing the above coated base fabric and thus the obtained airbag is light in weight and easily accommodated compactly. Additionally, the airbag hardly bursts at deployment.

(6) A production method of the coated base fabric for an airbag of any of (1) to (4), wherein weaving is performed by adjusting a warp tension to 30 to 70 cN/end and a shedding timing in weaving to 330 to 340 degrees.

In accordance with such configuration, warps can bend beaten wefts at weaving. Therefore, the fabric weave constraint in the weft direction of the fabric can be increased. As a result, the obtained coated base fabric hardly generates yarn slippage. Further, since yarn slippage of a sewn portion in the obtained airbag is prevented, air leakage can be easily inhibited and the obtained airbag is excellent in burst resistance.

EXAMPLE

Hereinafter, our base fabrics, airbags and methods will be explained in more detail by Examples. This disclosure is not limited to these Examples. In the following Examples, respective characteristic values were calculated by the following methods.

Calculation Methods of Characteristic Values
Total Fineness

The fineness based on corrected weight for a predetermined load of 0.045 cN/dtex was measured according to JIS L1013 (2010) 8.3.1 A method to provide the value of total fineness.

Number of Filaments

The number of filaments was measured according to a method of JIS L1013 (2010) 8.4.

Single Fiber Fineness

The total fineness was divided by the number of filaments to calculate this value.

Tenacity and Elongation of Original Yarn

A measurement of tenacity and elongation was made under the constant-rate extension conditions for the standard test specified in JIS L1013 (2010) 8.5.1. The tests were carried out using a TENSILON UCT-100 manufactured by Orientec Co., Ltd. with a grip distance of 25 cm and a tension speed of 30 cm/min. The tenacity (cN/dtex) was determined by dividing the breaking strength (cN) of the fibers by the total fineness of the fibers. The elongation was determined from the point for the maximum strength in the S-S curve.

Fabric Density

The fabric density of warps and wefts was measured according to JIS L1096: 2010 8.6.1. Specifically, a specimen was placed on a flat table, and unnatural creases and tension were removed. The number of warp and weft yarns for a 2.54 cm section was counted for five different positions, followed by calculating the average.

Basis Weight

According to JIS L1096: 2010 8.3.2, three 20 cm×20 cm specimens were sampled and their weight (g) was measured. The average (g/m$^2$) was calculated in the form of mass per 1 m$^2$.

Thickness

According to JIS L1096: 2010 8.4 A method, the thickness (mm) was measured at five positions of a specimen, followed by calculating the average.

Coating Weight

A base fabric processed in the similar condition except that a resin had not been coated was prepared as a blank sample. The basis weight of the blank sample was measured according to the above and a difference between the basis weight of the base fabric produced by coating the fabric with a resin and the basis weight of the blank sample was calculated as a coating weight. When a blank sample cannot be prepared and the coating weight is calculated only from the base fabric produced by coating the fabric with a resin, the coating weight can be calculated by dissolving the coated resin by use of an agent, subtracting the weight of the base fabric after the resin had been dissolved from the weight of the original base fabric on which the resin had been coated, and further dividing this value by an area of the base fabric on which the resin had been coated.

Strength and Elongation of Disintegrated Yarn

According to the constant-rate extension conditions as shown in the standard test specified in JIS L1013: 2010 8.5.1, a measurement was made by twisting a disintegrated yarn taken from a center portion of the base fabric by 20 times/25 cm. The test was carried out using a TENSILON UCT-100 manufactured by Orientec Co., Ltd. as a measurement apparatus with a grip distance of 25 cm and a tension speed of 30 cm/min. The tenacity (cN/dtex) of the disintegrated yarn was determined by dividing the breaking strength (cN) of the obtained disintegrated yarn by the total fineness of the disintegrated yarn. The elongation was determined from the point for the maximum breaking strength in the S-S curve.

Total Fineness of Disintegrated Yarn

Five yarns each of warps of 50 cm and wefts of 90 cm were taken from the center portion of the basic fabric and an apparent fineness was calculated from the weight of yarns (cutting method).

Example 1

Preparation of Yarn

Untwisted synthetic filaments which consist of nylon 6,6, having a circular sectional shape, and composed 72 filaments of a single fiber with a single fiber fineness of 2.43 dtex, a total fineness of 175 dtex, a tenacity of 9.2 cN/dtex and an elongation of 23.5% were prepared as warps and wefts.

Weaving

The above yarns were used as warps and wefts and a fabric in which a fabric density of warps and wefts is both 83 yarns/2.54 cm was woven in a water jet loom. At that time, a warp tension was adjusted to 39 cN/end, a shedding timing was 330 degrees and a rotation number of the loom was 500 rpm.

Refinement and Heat Setting

Subsequently, the obtained fabric was refined appropriately by a normal method and dried. After that, a heat setting process was performed at 160° C. for one minute under a dimension regulation of a tentering rate of 0% and an over feed rate of 0% by use of a pin stenter.

Resin Coating

Then, by use of equipment in which a bed board had been installed in front of a floating knife, a non-solvent-type methyl vinyl silicone resin liquid having a viscosity of 12 Pa·s (12,000 cP) was coated on the obtained fabric with a floating knife coater using a knife with a sheathing board such that the coating weight became 14 g/m$^2$. After that, a vulcanization process was performed at 190° C. for one minute to obtain a base fabric. The thickness of the coated base fabric was 0.19 mm. Characteristics of the obtained base fabric are shown in Table 1.

Example 2

Preparation of Yarn

Untwisted synthetic filaments which consist of nylon 6,6, having a circular sectional shape, and composed 36 filaments of a single fiber with a single fiber fineness of 3.26 dtex, a total fineness of 235 dtex, a tenacity of 9.0 cN/dtex and an elongation of 23.4% were prepared as warps and wefts.

Weaving

The above yarns were used as warps and wefts and a fabric in which a fabric density of warps and wefts is both 72 yarns/2.54 cm was woven in a water jet loom which is similar to that of Example 1. At that time, a warp tension was adjusted to 54 cN/end, a shedding timing was 340 degrees and a rotation number of the loom was 500 rpm.

Refinement and Heat Setting

Subsequently, the obtained fabric was refined, dried and heat-set appropriately in the similar manner to Example 1.

Resin Coating

Then, by use of the similar equipment as that of Example 1, a non-solvent-type methyl vinyl silicone resin liquid having a viscosity of 12 Pa·s (12,000 cP) was coated on the obtained fabric such that the coating weight became 15 g/m². After that, a vulcanization process was performed at 190° C. for one minute to obtain a base fabric. The thickness of the coated base fabric was 0.22 mm. Characteristics of the obtained base fabric are shown in Table 1.

Example 3

Preparation of Yarn

Untwisted synthetic filaments which consist of nylon 6,6, having a circular sectional shape, and composed of 72 filaments of a single fiber with a single fiber fineness of 2.43 dtex, a total fineness of 175 dtex, a tenacity of 9.1 cN/dtex and an elongation of 23.7% were prepared as warps and wefts.

Weaving

Weaving was performed in the similar manner as in Example 1 except that a warp tension was adjusted to 41 cN/end and a shedding timing was 340 degrees.

Refinement and Heat Setting

Subsequently, the obtained fabric was refined, dried and heat-set appropriately in the similar manner to Example 1.

Resin Coating

Then, by use of equipment in which a bed board had been installed in front of a floating knife, a non-solvent-type methyl vinyl silicone resin liquid having a viscosity of 12 Pa·s (12,000 cP) was coated on the obtained fabric with a floating knife coater using a knife with a sheathing board such that the coating weight became 14 g/m². After that, a vulcanization process was performed at 190° C. for one minute to obtain a base fabric. Characteristics of the obtained base fabric are shown in Table 1.

Comparative Example 1

Preparation of Yarn

Untwisted synthetic filaments which consist of nylon 6,6, having a circular sectional shape, and composed of 36 filaments of a single fiber with a single fiber fineness of 4.86 dtex, a total fineness of 175 dtex, a tenacity of 8.6 cN/dtex and an elongation of 23.4% were prepared as warps and wefts.

Weaving

The above yarns were used as warps and wefts and a fabric in which a fabric density of warps and wefts is both 84 yarns/2.54 cm was woven in a water jet loom which is similar to that of Example 1. At that time, a warp tension was adjusted to 75 cN/end, a shedding timing was 330 degrees and a rotation number of the loom was 500 rpm.

Refinement and Heat Setting

Subsequently, the obtained fabric was refined, dried and heat-set appropriately in the similar manner to Example 1.

Resin Coating

Then, by use of the similar equipment as that of Example 1, a non-solvent-type methyl vinyl silicone resin liquid having a viscosity of 12 Pa·s (12,000 cP) was coated on the obtained fabric such that the coating weight became 23 g/m². After that, a vulcanization process was performed at 190° C. for one minute to obtain a base fabric. The thickness of the coated base fabric was 0.19 mm. Characteristics of the obtained base fabric are shown in Table 1.

Comparative Example 2

Preparation of Yarn

Synthetic filaments similar to those of Comparative example 1 were prepared as warps and wefts.

Weaving

Weaving was performed in the similar manner as in Comparative example 1 except that a shedding timing was 0 degree.

Refinement and Heat Setting

Subsequently, the obtained fabric was refined, dried and heat-set appropriately in the similar manner to Example 1.

Resin Coating

Then, by use of the similar equipment as that of Example 1, a non-solvent-type methyl vinyl silicone resin liquid having a viscosity of 12 Pa·s (12,000 cP) was coated on the obtained fabric such that the coating weight became 15 g/m². After that, a vulcanization process was performed at 190° C. for one minute to obtain a base fabric. The thickness of the coated base fabric was 0.19 mm. Characteristics of the obtained base fabric are shown in Table 1.

Comparative Example 3

Preparation of Yarn

Synthetic filaments similar to those of Comparative example 1 were prepared as warps and wefts.

Weaving

The above yarns were used as warps and wefts and a fabric in which a fabric density of warps and wefts is both 83 yarns/2.54 cm was woven in a water jet loom which is similar to that of Example 1. At that time, a warp tension was adjusted to 39 cN/end, a shedding timing was 330 degrees and a rotation number of the loom was 500 rpm.

Refinement and Heat Setting

Subsequently, the obtained fabric was refined, dried and heat-set appropriately in the similar manner to Example 1.

Resin Coating

Then, by use of the similar equipment as that of Example 1, a non-solvent-type methyl vinyl silicone resin liquid having a viscosity of 12 Pa·s (12,000 cP) was coated on the obtained fabric such that the coating weight became 15 g/m². After that, a vulcanization process was performed at 190° C. for one minute to obtain a base fabric. The thickness of the coated base fabric was 0.19 mm. Characteristics of the obtained base fabric are shown in Table 1.

Comparative Example 4

Preparation of Yarn

Untwisted synthetic filaments which consist of nylon 6,6, having a circular sectional shape, and composed of 136 filaments of a single fiber with a single fiber fineness of 3.46 dtex, a total fineness of 470 dtex, a tenacity of 8.6 cN/dtex and an elongation of 24.0% were prepared as warps and wefts.

Weaving

The above yarns were used as warps and wefts and a fabric in which a fabric density of warps and wefts is both 50 yarns/2.54 cm was woven in a water jet loom which is similar to that of Example 1. At that time, a warp tension was adjusted to 108 cN/end, a shedding timing was 0 degree and a rotation number of the loom was 500 rpm.

Refinement and Heat Setting

Subsequently, the obtained fabric was refined, dried and heat-set appropriately in the similar manner to Example 1.

Resin Coating

Then, by use of the similar equipment as that of Example 1, a non-solvent-type methyl vinyl silicone resin liquid having a viscosity of 12 Pa·s (12,000 cP) was coated on the obtained fabric such that the coating weight became 25 g/m². After that, a vulcanization process was performed at 190° C. for one minute to obtain a base fabric. The thickness of the coated base fabric was 0.30 mm. Characteristics of the obtained base fabric are shown in Table 1.

Comparative Example 5

Preparation of Yarn

Untwisted synthetic filaments which consist of nylon 6,6, having a circular sectional shape, and composed of 36 filaments of a single fiber with a single fiber fineness of 4.86 dtex, a total fineness of 175 dtex, a tenacity of 9.1 cN/dtex and an elongation of 23.4% were prepared as warps and wefts.

Weaving

The above yarns were used as warps and wefts and a fabric in which a fabric density of warps and wefts is both 84 yarns/2.54 cm was woven in a water jet loom which is similar to that of Example 1. At that time, a warp tension was adjusted to 48 cN/end, a shedding timing was 0 degree and a rotation number of the loom was 500 rpm.

Refinement and Heat Setting

Subsequently, the obtained fabric was refined, dried and heat-set appropriately in the similar manner to Example 1.

Resin Coating

Then, by use of the similar equipment as that of Example 1, a non-solvent-type methyl vinyl silicone resin liquid having a viscosity of 12 Pa·s (12,000 cP) was coated on the obtained fabric such that the coating weight became 15 g/m². After that, a vulcanization process was performed at 190° C. for one minute to obtain a base fabric. Characteristics of the obtained base fabric are shown in Table 1.

With reference to respective base fabrics as obtained in Examples 1 to 3 and Comparative examples 1 to 5, packability of base fabric, tensile strength, tear strength, edgecomb resistance, weaving properties and deployment property were evaluated according to the following evaluation methods. The results are shown in Table 1.

Evaluation Method

Packability of Base Fabric

Packability of a base fabric was measured based on ASTM D6478-02.

Tensile Strength

According to JIS K 6404-3 6. Test Method B (Strip Method), five specimens each were taken for the warp direction and the weft direction, and some yarns were removed from both sides of each specimen to adjust the width to 30 mm. In a constant-speed type tester, the specimen was set with a grip distance of 150 mm and pulled at a tension speed of 200 mm/min until it was broken. The maximum load during the pulling period was measured and the average was calculated for the warp direction and the weft direction.

Tear Strength

According to JIS K 6404-4 (1999) 6. Test Method B (Single Tongue Method), five specimens each with a long side of 200 mm and a short side of 76 mm were taken in the warp direction and the weft direction. A 75 mm cut was made from the center of a short side at right angles to the short side of each specimen, and it was set with a grip distance of 75 mm and pulled at a tension speed of 200 mm/min until it was torn. The load applied was measured at the time of breakage. In the tear test load chart recorded, the first peak was neglected and the three largest of the remaining maximums were taken and averaged. Averages were calculated for both the warp direction and the weft direction.

Edgecomb Resistance

Edgecomb resistance was calculated according to ASTM D6479-02.

Weaving Properties

Weaving properties are determined by measuring a stopped number per an hour at weaving of a fabric. The stopped number of not more than two is determined as ○, the stopped number of three to five is determined as Δ and the stopped number of not less than six or when weaving cannot be continued is determined as ×.

Deployment Property of Bag

First, a module was assembled using an airbag for driver seat, an inflator (EE type, output of 190 kPa) manufactured by Daicel Corporation and a fixing metal. A deployment test was performed at 25° C. and a presence of burst at deployment and the point where a burst had been generated were observed. The airbag for driver seat, was prepared as described below.

From the respective base fabrics of Examples 1 to 3 and Comparative examples 1 to 5, two circular body panels with an outer diameter of 640 mm and three circular reinforcing fabric panels with an outer diameter of 240 mm were taken out. A hole to attach the inflator with a diameter of 76 mm was provided in a center of the body panels and reinforcing fabric panels. Two vent holes (diameter: 20 mm) were provided at a position of 250 mm from the center of the hole for attaching, on a line which is obliquely upwardly shifted by 45 degrees. After that, the holes to attach the three reinforcing fabric panels and the one body panel were superimposed and the positions of a diameter of 85 mm, a diameter of 180 mm and a diameter of 196 mm from the center of the holes were circularly sewn in a lockstitch with a pitch of 2.5 mm. Then, the other body panel was superimposed on the above four superimposed panels such that a warp direction is shifted by 45 degrees and the position of a diameter of 615 mm from the center of the holes was circularly sewn in a double-loop stitch with a pitch of 2.5 mm. After providing a bolt hole which is necessary to fix between the obtained bag and the fixing metal, the bag was reversed such that the reinforcing fabric became inside and the airbag for driver sheet was obtained.

TABLE 1

|  | Examples | | | Comparative examples | | | | |
| --- | --- | --- | --- | --- | --- | --- | --- | --- |
|  | 1 | 2 | 3 | 1 | 2 | 3 | 4 | 5 |
| Characteristics of polyamide fiber | | | | | | | | |
| Total fineness (dtex) | 175 | 235 | 175 | 175 | 175 | 175 | 470 | 175 |
| Number of filaments | 72 | 72 | 72 | 36 | 36 | 36 | 136 | 36 |
| Single fiber fineness (dtex) | 2.43 | 3.26 | 2.43 | 4.86 | 4.86 | 4.86 | 3.46 | 4.86 |
| Tenacity (cN/dtex) | 9.2 | 9.0 | 9.1 | 8.6 | 8.6 | 8.6 | 8.6 | 9.1 |

TABLE 1-continued

|  | Examples ||| Comparative examples |||||
| --- | --- | --- | --- | --- | --- | --- | --- | --- |
|  | 1 | 2 | 3 | 1 | 2 | 3 | 4 | 5 |
| Weaving condition of fabric | | | | | | | | |
| Warp tension (cN/end) | 39 | 54 | 41 | 75 | 75 | 39 | 108 | 48 |
| Shedding timing (degree) | 330 | 340 | 340 | 330 | 0 | 330 | 0 | 0 |
| Coating condition of resin | | | | | | | | |
| Coating weight (g/m²) | 14 | 15 | 14 | 23 | 15 | 15 | 25 | 15 |
| Characteristics of base fabric and airbag | | | | | | | | |
| Basis weight (g/m²) | 140 | 165 | 143 | 154 | 144 | 138 | 228 | 144 |
| Thickness (mm) | 0.19 | 0.22 | 0.19 | 0.19 | 0.19 | 0.19 | 0.30 | 0.19 |
| Fabric density (yarn/2.54 cm) | | | | | | | | |
| Warp | 83 | 72 | 83 | 84 | 84 | 83 | 50 | 84 |
| Weft | 82 | 72 | 83 | 83 | 83 | 82 | 50 | 83 |
| Tenacity of disintegrated yarn (cN/dtex) | | | | | | | | |
| Warp | 8.2 | 8.1 | 8.2 | 7.7 | 7.6 | 7.7 | 7.7 | 8.2 |
| Weft | 8.3 | 8.2 | 8.2 | 7.6 | 7.7 | 7.8 | 7.7 | 8.2 |
| Elongation of disintegrated yarn (%) | | | | | | | | |
| Warp | 19.5 | 20.2 | 20.0 | 22.0 | 22.2 | 21.6 | 21.5 | 19.8 |
| Weft | 19.8 | 21.0 | 20.3 | 21.8 | 22.2 | 22.2 | 20.8 | 19.6 |
| Fineness of disintegrated yarn (dtex) | | | | | | | | |
| Warp | 178 | 239 | 178 | 177 | 176 | 178 | 476 | 177 |
| Weft | 177 | 240 | 178 | 178 | 177 | 176 | 472 | 178 |
| Characteristics of base fabric and airbag | | | | | | | | |
| Cover factor | 2071 | 2094 | 2083 | 2098 | 2098 | 2071 | 2057 | 2096 |
| Packability of base fabric (cm³) | 1135 | 1321 | 1181 | 1190 | 1188 | 1098 | 2205 | 1186 |
| Tensile strength (N/cm) | | | | | | | | |
| Warp direction | 464 | 541 | 493 | 479 | 482 | 451 | 724 | 491 |
| Weft direction | 464 | 508 | 492 | 451 | 454 | 458 | 715 | 500 |
| Tear strength (N) | | | | | | | | |
| Warp direction | 219 | 232 | 222 | 177 | 167 | 250 | 301 | 189 |
| Weft direction | 237 | 236 | 208 | 183 | 185 | 266 | 317 | 179 |
| Edgecomb resistance | | | | | | | | |
| Warp direction | 301 | 489 | 385 | 513 | 493 | 179 | 577 | 301 |
| Weft direction | 273 | 402 | 407 | 481 | 486 | 178 | 516 | 273 |
| Weaving properties | ○ | ○ | ○ | Δ | Δ | Δ | ○ | Δ |
| Deployment property of bag | No burst from peripheral sewn portion and attached portion | No burst from peripheral sewn portion and attached portion | No burst from peripheral sewn portion and attached portion | Burst from attached portion | Burst from attached portion | Burst from sewn portion | No burst from peripheral sewn portion and attached portion | Burst from attached portion |

As shown in Table 1, the base fabrics as prepared in Examples 1 to 3 were light in weight and excellent in compactness. In addition, both tear strength and edgecomb resistance of these base fabrics were not less than 200 N and a burst was not generated in airbag deployment tests. In particular, the base fabric of Example 1 was lighter and excellent in compactness.

On the other hand, in the base fabrics as prepared in Comparative examples 1 and 2, tenacity of the used yarn was low and tear strength was also low. As a result, in an airbag deployment test using this base fabric, a burst was generated in the attached portion. Further, weaving properties of this base fabric were insufficient and fluffing was generated at weaving.

Moreover, in the base fabric as prepared in Comparative example 3, tenacity of the used yarn was low and edgecomb resistance was also low. As a result, in an airbag deployment test using an airbag made of this base fabric, a burst was generated in the attached portion.

Further, in the base fabric as prepared in Comparative example 4, the used yarn had low tenacity, a large basis weight and large packability of base fabric. As a result, this base fabric could not be said to be light in weight and compactness was inferior.

The base fabric as prepared in Comparative example 5 was not woven at an appropriate shedding timing and, therefore, tear strength thereof was low. As a result, in an airbag deployment test using an airbag made of this base fabric, a burst was generated in the attached portion. Additionally, weaving properties of this base fabric were insufficient.

The invention claimed is:

1. A coated base fabric for an airbag in which a fabric composed of polyamide fibers is provided with a resin coating, wherein the polyamide fibers composing the base fabric have a total fineness of not less than 100 dtex and not more than 250 dtex and a tenacity of not less than 8.1 cN/dtex, and the coated base fabric for airbag has a basis weight of not more than 170 g/m$^2$, packability of the base fabric in accordance with ASTM D6478-02 of not more than 1,400 cm$^3$, a tear strength in a warp direction and a weft direction of not less than 200 N, and an edgecomb resistance in the warp direction and the weft direction of not less than 200 N.

2. The coated base fabric of claim 1, wherein tenacity of the polyamide fibers is not less than 9.0 cN/dtex.

3. The coated base fabric of claim 1, wherein a coating weight of the resin is 5 to 20 g/m$^2$.

4. The coated base fabric of claim 1, wherein a single fiber fineness of the polyamide fibers is 1 to 4 dtex.

5. An airbag produced by sewing the coated base fabric of claim 1.

6. A method of producing the coated base fabric of claim 1, comprising performing weaving by adjusting warp tension to 30 to 70 cN/end and shedding timing in weaving to 330 to 340 degrees.

7. The coated base fabric of claim 2, wherein a coating weight of the resin is 5 to 20 g/m$^2$.

8. The coated base fabric of claim 2, wherein a single fiber fineness of the polyamide fibers is 1 to 4 dtex.

* * * * *